United States Patent Office

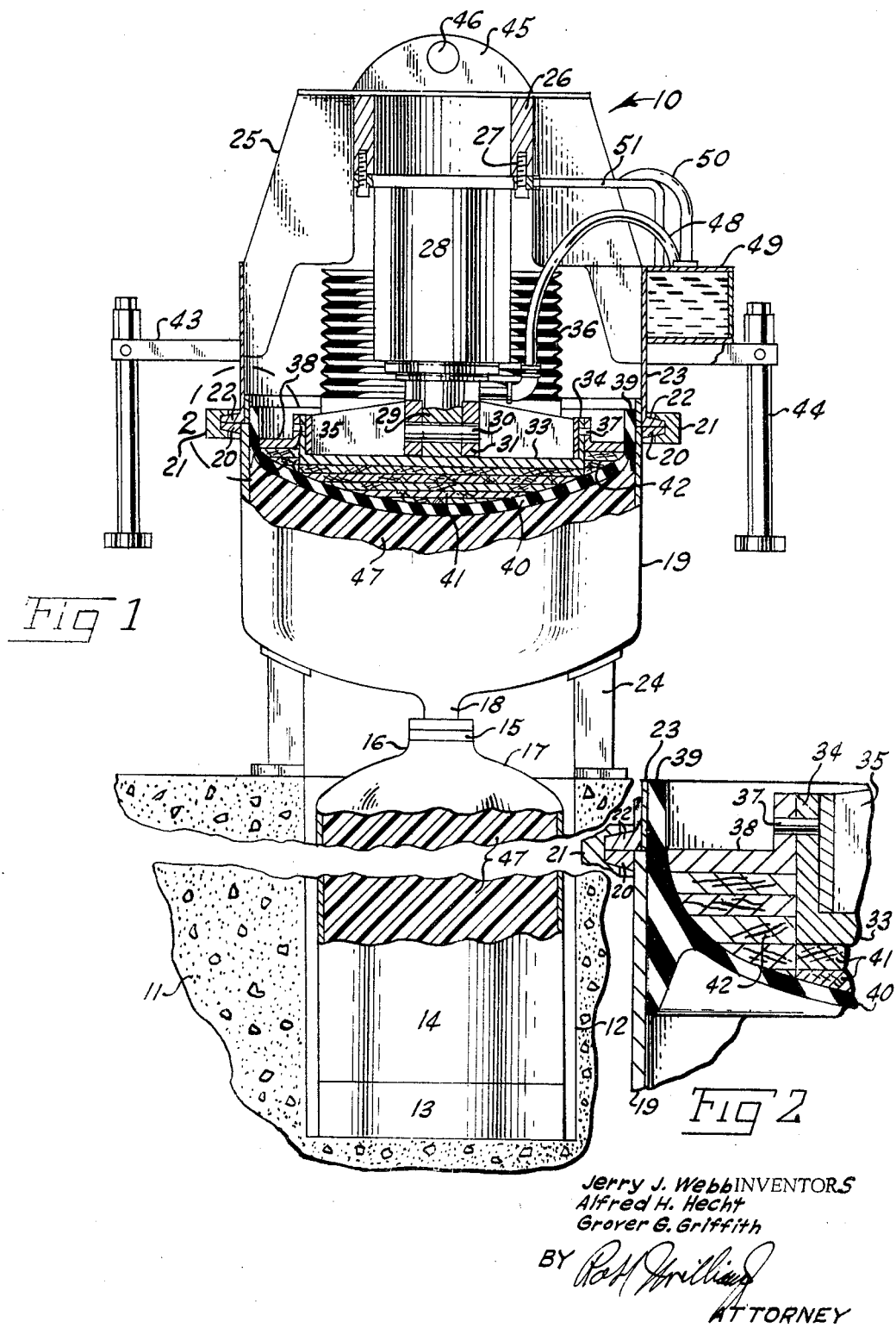

3,508,688
Patented Apr. 28, 1970

3,508,688
HYDRAULIC ACTUATOR FOR SOLID PROPELLANT CASTING ASSEMBLY
Jerry J. Webb, Alfred H. Hecht, and Grover G. Griffith, Huntsville, Ala., assignors to Thiokol Chemical Corporation, Bristol, Pa., a corporation of Delaware
Filed Oct. 2, 1967, Ser. No. 672,217
Int. Cl. G01f 11/08
U.S. Cl. 222—326          6 Claims

ABSTRACT OF THE DISCLOSURE

A hydraulic actuator that is to be mounted on a casting can for solid propellant to control the flow of the viscous uncured solid propellant from the casting can into a rocket motor case.

BACKGROUND OF THE INVENTION

(1) Field of the invention

One of the present methods for fabricating a solid propellant rocket motor is known as casting. This involves pouring or casting a viscous uncured solid propellant mixture from a casting can into a rocket motor case. A core is positioned in the rocket motor case and the viscous uncured solid propellant must completely fill that area between the core and the inner surface of the wall of the rocket motor case without voids or air pockets forming in the viscous uncured solid propellant while it is being poured or cast into the rocket motor case.

The flow of the viscous uncured solid propellant into the rocket motor case must be controlled to avoid voids and air pockets and for such control special apparatus such as in the instant invention have been developed to acquire a cured solid propellant grain that will meet rigid specifications.

(2) Description of the prior art

One of the present methods of extruding a viscous uncured solid propellant from casting cans involves the utilization of air under pressure but this method occasionally results in air contamination of the viscous uncured solid propellant and "blow throughs" inside the casting can that seriously aerate the viscous uncured solid propellant so that it can not be used and as to be replaced with deaerated propellant.

Since this method resulted in unnecessary extra costs to produce the solid propellant rocket motor some method had to be developed that would eliminate such costs and prevent extra expense in the production of the solid propellant rocket motor.

SUMMARY OF THE INVENTION

The instant invention was developed therefore to provide improvements in hydraulic actuators that are usable for casting viscous uncured solid propellants into rocket motor cases and more particularly to hydraulic actuators that produce a controlled flow rate of the viscous uncured propellant from a casting can into a rocket motor case.

The instant invention provides a positive controllable method of removing the viscous uncured solid propellant from the casting can without deaerating conditions that occasionally result from the method utilizing air under pressure.

It is an object of the invention, therefore, to provide a hydraulic actuator that will deliver a controlled flow of viscous uncured solid propellant from a casting can into a rocket motor case.

With the above and other objects and advantages in view the invention consists of the novel details of construction, arrangement and combination of parts more fully hereinafter described, claimed and illustrated in the accompanying drawing, in which:

BRIEF DESCRIPTION OF THE DRAWING

FIGURE 1 is a vertical sectional view showing the hydraulic actuator embodying the invention as it is used in conjunction with the casting can and the rocket motor case; and FIGURE 2 is an enlarged diagrammatical sectional view of that area within the dotted circle 2 in FIGURE 1.

DESCRIPTION OF THE PREFERRED EMBODIMENTS

Referring more in detail to the drawing, wherein like parts are designated by like reference numerals, the reference numeral 10 is used to generally designate the hydraulic actuator embodying the invention.

In conventional practice a foundation of concrete 11 is cast into an excavation in the ground so that the upper surface of the foundation is level with the ground surface and a cylindrical pit 12 of any convenient size is formed in the foundation 11.

A suitable support 13 is placed on the bottom of the pit 12 to support thereon a rocket motor case 14. A suitable connection 15 connects an inlet neck 16 of a cap 17 that is positioned on and secured to the aft end of the rocket motor case 14 and the inlet neck 16 has communication with an outlet pipe 18 of a solid propellant casting can 19.

The can 19 at its upper open end has an annular right angularly disposed flange or collar 20 rigidly secured to the outer surface thereof and the flange or collar 20 is secured by a suitable U-shaped sectional clamp 21 or the like to an annular right angularly disposed flange or collar of a circular band 23 which forms the main body of the hydraulic actuator 10 and the lower surface of the casting can 19 has rigidly secured thereto four radially disposed supporting legs 24 that rest on the upper surface of the foundation 11 in relatively spaced relation to each other.

In describing the invention the hydraulic actuator 10 comprises the circular band 23 to which is rigidly secured a top frame 25.

Depending from and secured to the central portion of the under surface of the frame 25 is a short circular wall 26 forming a support to which is rigidly secured by bolts 27 a double acting telescoping hydraulic cylinder 28.

A stud 29 depends from the lowermost end of the cylinder 28 and has a transverse opening therein to receive a pin 30 whereby a circular wall 31 forms a socket which receives and is connected to the stud 29 by the pin 30.

The wall 31 forming the socket is rigidly secured to the upper surface of a float or piston 33 which has an upstanding peripheral wall 34 that is annually spaced from the inner surface of the wall of the casting can 19 and four radially disposed brace members 35 extend between the wall 31 and the wall 34. A protective rubber bellows shaped boot extends between the frame 25 and members 35 in circumjacent relation to the cylinder 28 to protect it from dust and other extraneous matter that would collect thereon.

Secured to the outer surface of the wall 34 contiguous with the upper edge thereof by shear pins 37 in an L-shaped blow out ring 38 which engages a circular upstanding sealing wall 39 of a rubber diaphragm 40 which is positioned below and is spaced from the bottom surface of the float or piston 33.

The wall 39 of the diaphragm 40 functions as a seal between the peripheral edge of the ring 38 and the inner surface of the wall of the casting can 19.

As shown in FIGURE 1 the diaphragm 40 assumes a concavoconvex shape and the area or space between the bottom surface of the float or piston 33 and the inner surface of the diaphragm 40 is filled with a plurality of wooden filler layers 41. The peripheral edges of the layers 41 are shaped to conform to the configuration of the inner surface of the diaphragm 40 and a sufficient number of the layers 41 are used to maintain the shape of the diaphragm 40 without any change in the configuration of the outer surface thereof.

Positioned between the outer surface of the wall 34 of the float or piston 33 and the inner surface of the wall 39 of the diaphragm 40 is a plurality of blow out layer rings 42 with the upper surface of the uppermost of the rings 42 engaging the lower surface of the ring 38 and the lower surface of the lowermost ring of the rings 42 resting on the inner surface of the diaphragm 40.

The layer rings 42 and ring 38 function as blow out rings so that if any hazardous situations occur during the operation of the hydraulic actuator 10, the shear pins 37 will shear and no damage will occur to the assembly as previously described.

Extending outwardly thereof at right angles thereto and rigidly secured to the outer surface of the band 23 are four supporting bars 43 and adjustably mounted in each of the outer ends of the bars 43 is a supporting leg 44, which supports the hydraulic actuator 10 when it is to be stored and is not resting on the casting cam 19 as shown in FIG. 1. Also secured to the frame 25 is a lifting plate 45 having an opening 46 therein whereby a lifting device could be connected to the plate 45 to transport and move the hydraulic actuator 10 from inoperative or stored position into operating position as shown in FIG. 1.

In the operation of the invention a previously mixed viscous solid propellant 47 in its uncured state is poured into the casting can 19 and then the hydraulic acuator 10 is placed on the casting can 19 which is secured to the hydraulic actuator 10 as previously described and a hydraulic fluid is fed to the cylinder 28 by means of suitable tubing 48, which is connected to the hydraulic fluid reservoir 49 that is mounted on the bars 43 and is utilized to feed the hydraulic fluid to the cylinder 28. The hydraulic system used with the fluid reservoir 49 employs a supply tube 50 connected to the reservoir 49 and a fluid return tube 51 that is connected to the cylinder 28 and reservoir 49, the system is of conventional design employing two variable flow hydraulic pumps powered by an electric motor and the output of one of the pumps operates a hydraulic pacer motor that may be adjusted manually. A tape measuring the rate of travel of the float 33 and the components associated therewith coacts with the pacer motor to indicate and compare the flow from the hydraulic pumps. Any difference that occurs in the flow is immediately fed to the pumps and corrects their speed. The components are conventional and a uniform flow and movement of the telescoping cylinder 28 is achieved. Any one skilled in the art would be familiar with such a system does not provide an essential element of the invention, except as to the control of the rate of movement of the float or piston 33 is concerned.

After the hydraulic actuator 10 has been firmly secured in position as previously described the hydraulic fluid is fed to the cylinder 28 and the viscous uncured solid propellant 47 is extruded from the casting can 19 into the rocket motor case 14, as shown in FIGURE 1.

The formation of the float or piston 33, as previously described, permits the viscous uncured solid propellant 47 to be extruded into the motor case 14 without any air bubbles or voids occurring in the viscous uncured solid propellant 47. Thus the disadvantages that are present with extruding the viscous uncured solid propellant 47 from the casting can 19 by means of air under pressure are entirely eliminated.

It is believed that from the foregoing description the manner of operation, as well as the construction of the invention, will be clear to those skilled in the art and it is to be understood that any variations in the operations or construction thereof may be adhered to provided such variations fall within the spirit of the invention.

Having thus described the invention what is claimed as new and desired to be secured by Letters Patent is:

1. A hydraulic actuator for use in extruding viscous uncured solid propellant from a casting can into a rocket motor case comprising a circular band removably connected to the casting can, a frame secured so said band, a telescoping cylinder secured to said frame, a float secured to said cylinder, a rubber diaphragm positioned below said float and a plurality of filler members positioned between said float and said rubber diaphragm to maintain said diaphragm in extended position.

2. A hydraulic actuator as in claim 1, wherein a blow out ring is secured to said float and a plurality of blow out layer rings are positioned below said blow out ring in circumjacent relation to said float and the lowermost of said layer rings engage the inner surface of said rubber diaphragm.

3. A hydraulic actuator as in claim 2, wherein the rubber diaphragm is provided with an upstanding sealing wall that engages the inner surface of the casting can and the outer peripheral surface of the blow out ring impinges upon the inner surface of the sealing wall to seal the area of contact between the outer surface of the sealing wall and the inner surface of the casting can.

4. A hydraulic actuator as in claim 2, wherein the filler members and the blow out layer rings are formed from wood.

5. A hydraulic actuator as in claim 1, wherein means is provided for connecting said telescoping cylinder to a hydraulic actuating system.

6. A hydraulic actuator as in claim 1, wherein a plurality of supporting legs are secured to said circular band and a lifting plate is secured to said frame.

References Cited

UNITED STATES PATENTS

| | | | |
|---|---|---|---|
| 2,277,824 | 3/1942 | Franson | 222—326 |
| 2,955,728 | 10/1960 | Macklanburg | 222—386.5 |

STANLEY H. TOLLBERG, Primary Examiner

U.S. Cl. X.R.

222—389